(12) United States Patent
Ivanov et al.

(10) Patent No.: US 10,521,041 B2
(45) Date of Patent: Dec. 31, 2019

(54) RESONANT LINE DRIVER INCLUDING ENERGY TRANSFER INDUCTOR FOR DRIVING CAPACITIVE-LOAD LINES

(71) Applicant: Texas Instruments Incorporated, Dallas, TX (US)

(72) Inventors: Vadim V. Ivanov, Tucson, AZ (US); William R. Krenik, Garland, TX (US); Rajarshi Mukhopadhyay, Allen, TX (US); Baher S. Haroun, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/825,942

(22) Filed: Aug. 13, 2015

(65) Prior Publication Data
US 2016/0048260 A1 Feb. 18, 2016

Related U.S. Application Data

(60) Provisional application No. 62/036,809, filed on Aug. 13, 2014.

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01)

(58) Field of Classification Search
CPC .................. G06F 3/0416; G06F 3/044
See application file for complete search history.

(56) References Cited

U.S. PATENT DOCUMENTS

| 5,821,923 A * | 10/1998 | Van Amesfoort ........ G09G 3/20 345/212 |
| 5,914,701 A * | 6/1999 | Gersheneld ............. G06F 3/017 340/13.31 |
| 2006/0285366 A1* | 12/2006 | Radecker .......... H02M 3/33507 363/16 |
| 2007/0046659 A1* | 3/2007 | Iwami .................... G09G 3/296 345/211 |
| 2007/0182461 A1* | 8/2007 | Harvey .............. H03K 19/0019 327/112 |

(Continued)

*Primary Examiner* — Sahlu Okebato
(74) *Attorney, Agent, or Firm* — John R. Pessetto; Charles A. Brill; Frank D. Cimino

(57) ABSTRACT

A resonant line driver for driving capacitive-loads includes a driver series-coupled to an energy transfer inductor L1, driving signal energy at a signal frequency through L1. A switch array is controlled to switch L1 between multiple electrodes according to a switching sequence, each electrode characterized by a load capacitance CL. L1 and CL form a resonator circuit in which signal energy cycles between L1 and CL at the signal frequency. The switch array switches L1 between a current electrode and a next electrode at a zero_crossing when signal energy in the energy transfer inductor is at a maximum and signal energy in the load capacitance of the current electrode is at a minimum. An amplitude control loop controls signal energy delivered to the L1CL resonator circuit, and a frequency control loop controls signal frequency/phase. In an example application, the resonant driver provides line drive for a mutual capacitance touch screen.

19 Claims, 3 Drawing Sheets

(56) References Cited

U.S. PATENT DOCUMENTS

| | | | |
|---|---|---|---|
| 2008/0211478 A1* | 9/2008 | Hussman | H02M 3/3374 323/355 |
| 2012/0039378 A1* | 2/2012 | Nakayama | H02M 3/337 375/226 |
| 2014/0300201 A1* | 10/2014 | Ichikawa | H02J 5/00 307/104 |
| 2015/0002425 A1* | 1/2015 | Lee | G06F 3/0416 345/173 |
| 2015/0009171 A1* | 1/2015 | Shepelev | G06F 3/044 345/174 |

* cited by examiner

RESONANT LINE DRIVER INCLUDING ENERGY TRANSFER INDUCTOR FOR DRIVING CAPACITIVE-LOAD LINES

CROSS-REFERENCE TO RELATED APPLICATIONS

Priority is claimed under 37 CFR 1.78 and 35 USC 119(e) to U.S. Provisional Application 62/036,809, filed 13 Aug. 2014), which is incorporated by reference.

BACKGROUND

Technical Field

This Patent Disclosure relates generally to driver circuits for driving capacitive-load lines, such as mutual capacitance touch screens.

Related Art

A mutual capacitance touch screen is an example of a system requiring driving a capacitive load. The screen includes x/y (row/column) lines, with x-line drivers and y-line sense amps. Each x-line is characterized by a line-capacitance load.

FIGS. 1A and 1B illustrate a mutual capacitance touch screen with row/column (x/y) electrodes/lines, including line drivers and y-line sense amps.

One or more line drivers sequentially drive each line capacitance. Each driver output is a sinusoid voltage signal. Switch between multiple drivers to switch rows/columns on the display.

Touch systems commonly perform continuous/frequent scans to detect and respond to touches. This continual scanning operation consumes energy, especially for systems that need to monitor the panel for touches even when the display backlight is shut off.

One common approach to line driving is to use a boost converter to generate a high voltage rail and then to use class AB amplifiers to drive sinusoidal stimulation. That is, boost efficiency (which is relatively higher) is followed with the amp efficiency (which is relatively lower).

In addition, these line driver configurations require an array of driver ICs. Signal power is dissipated driving the line capacitance ($fCV^2$). In addition, power is dissipated at the display capacitors.

In addition, line drivers need to support high-voltage signals. Design becomes complicated with low-cost deep-submicron CMOS technologies. High-voltage design trade-offs can degrade signal linearity performance.

While this Background information references wireless base station application, the Disclosure in this Patent Document is not limited to such applications, but is more generally directed to direct conversion wireless architectures.

BRIEF SUMMARY

This Brief Summary is provided as a general introduction to the Disclosure provided by the Detailed Description and Drawings, summarizing aspects and features of the Disclosure. It is not a complete overview of the Disclosure, and should not be interpreted as identifying key elements or features of, or otherwise characterizing or delimiting the scope of, the disclosed invention.

This Disclosure describes apparatus and methods for a resonant line driver including energy transfer inductor for driving capacitive-loads (load lines), such as for driving the drive lines of a mutual capacitance touch screen.

According to aspects of the Disclosure, a resonant line driver for driving capacitive-loads includes a driver series-coupled to an energy transfer inductor L1, driving signal energy at a signal frequency through L1. A switch array is controlled to switch L1 between multiple electrodes according to a switching sequence, each electrode characterized by a load capacitance CL. L1 and CL form a resonator circuit in which signal energy cycles between L1 and CL at the signal frequency. The switch array switches L1 between a current electrode and a next electrode at a zero_crossing when signal energy in the energy transfer inductor is at a maximum and signal energy in the load capacitance of the current electrode is at a minimum. An amplitude control loop controls signal energy delivered to the L1CL resonator circuit, and a frequency control loop controls signal frequency/phase. In an example application, the resonant driver provides line drive for a mutual capacitance touch screen.

Other aspects and features of the invention claimed in this Patent Document will be apparent to those skilled in the art from the following Disclosure.

DETAILED DESCRIPTION

This Description and the Drawings constitute a Disclosure for a resonant line driver including energy transfer inductor for driving capacitive-load lines, including example embodiments that illustrate various technical features and advantages.

This Disclosure is given in the context of an example mutual capacitance touch screen application. However, the switched resonant line driver including energy transfer inductor for driving capacitive-load lines is suitable and adaptable for driving other capacitive-load lines, such as piezo-sensors.

In brief overview, a resonant line driver for driving capacitive-loads includes a driver series-coupled to an energy transfer inductor L1, driving signal energy at a signal frequency through L1. A switch array is controlled to switch L1 between multiple electrodes according to a switching sequence, each electrode characterized by a load capacitance CL. L1 and CL form a resonator circuit in which signal energy cycles between L1 and CL at the signal frequency. The switch array switches L1 between a current electrode and a next electrode at a zero_crossing when signal energy in the energy transfer inductor is at a maximum and signal energy in the load capacitance of the current electrode is at a minimum. An amplitude control loop controls signal energy delivered to the L1CL resonator circuit, and a frequency control loop controls signal frequency/phase.

Figure 1A:
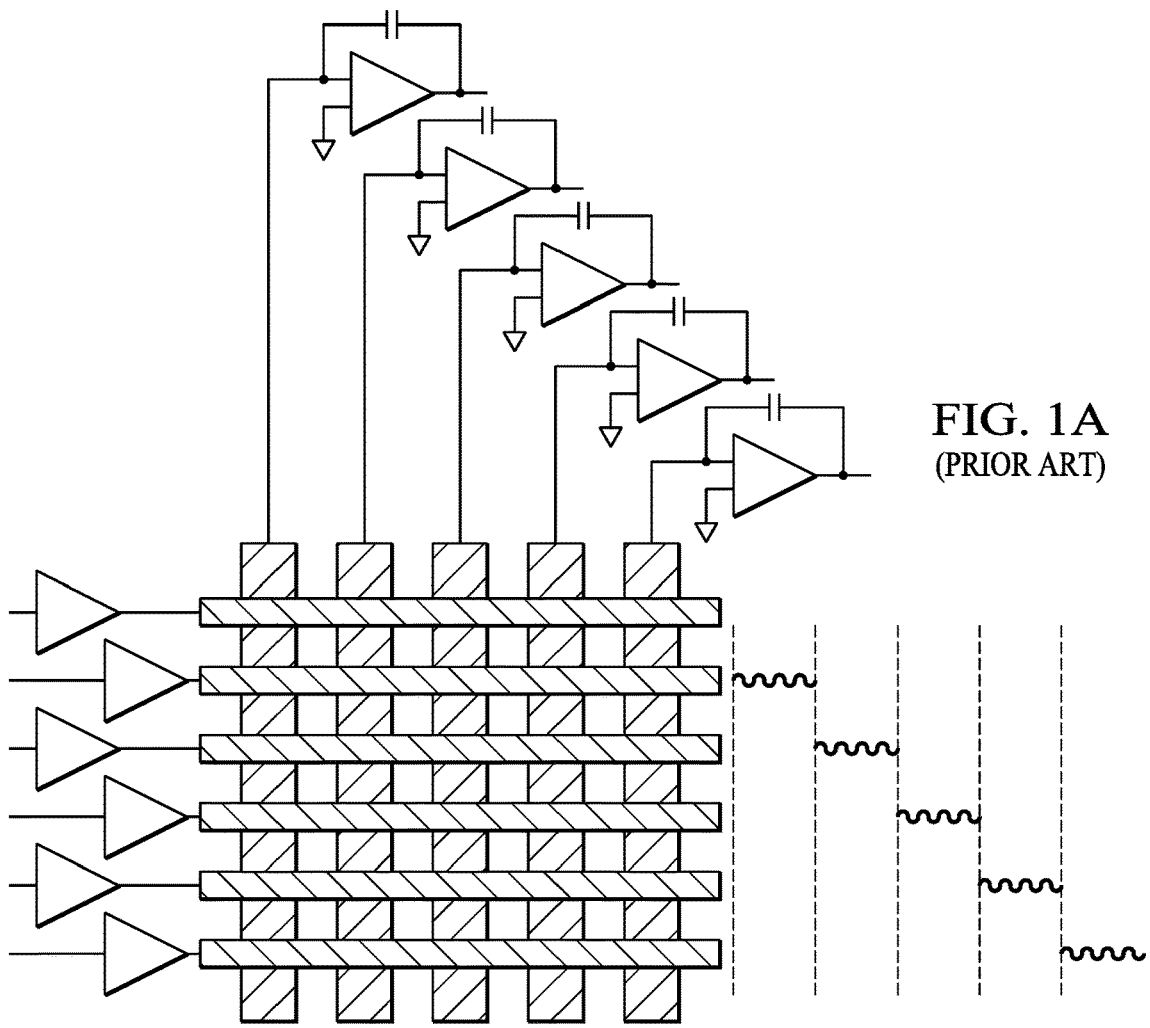
FIGS. 1A and 1B illustrate a mutual capacitance touch screen with x/y (row/column) electrodes/lines, including x-line drivers and y-line sense amps.
Figure 1B:
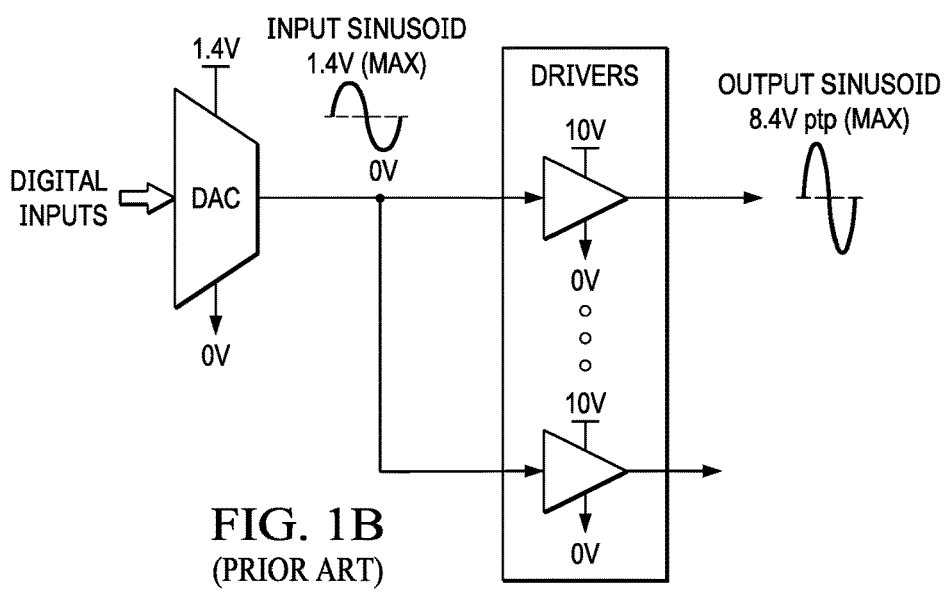
Figure 2:
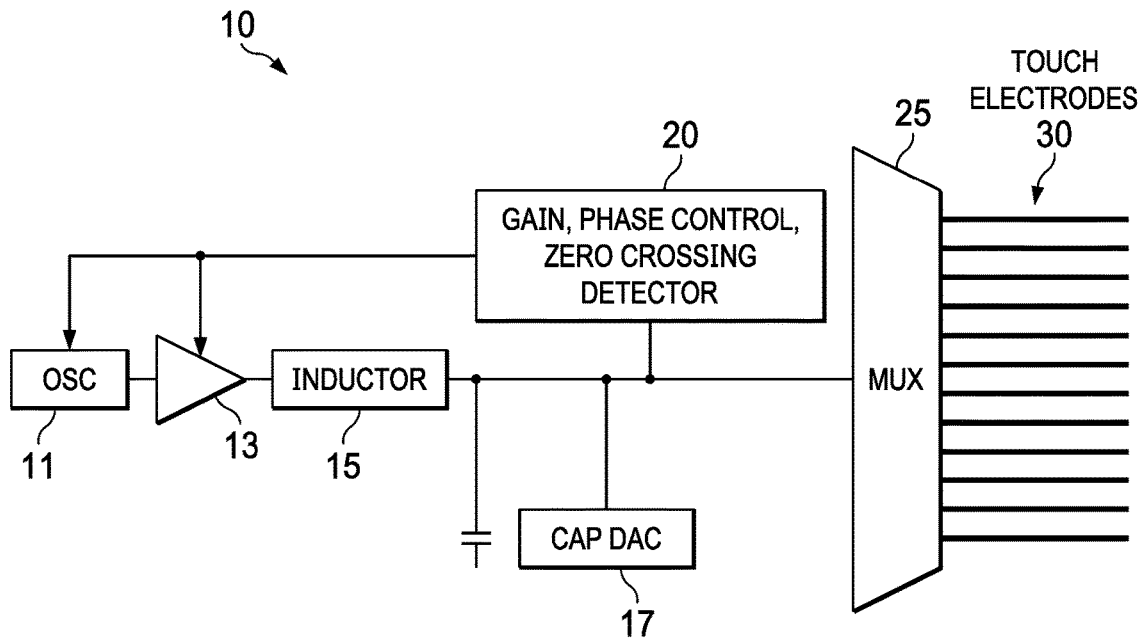
FIG. 2 illustrates an example functional embodiment of a switched resonant line driver including energy transfer inductor for driving capacitive-load lines, such as the drive lines of an example mutual capacitance touch screen.

FIG. 2 illustrates an example functional embodiment of a switched resonant line driver including an energy transfer inductor for driving capacitive-load lines, such as the drive lines of an example mutual capacitance touch screen.

A resonant driver includes a series-coupled energy transfer inductor. The energy transfer inductor and the line capacitance form a resonator.

The resonant line driver/inductor can use a capacitor in parallel with the panel electrode capacitance.

The energy transfer inductor and line capacitance form an LC resonator tank circuit used to drive the panel using a resonant drive scheme. Operating at resonance efficiently boosts the stimulation voltage while delivering a sinusoidal drive to reduce EMI while operating inside the panel bandwidth.

The drive amplifier can drive the LC resonator with a square wave, with the LC tank circuit providing sufficient filtering to generate a substantially sinusoidal drive signal.

A capacitive DAC can be used in parallel with the line capacitance to adjust for differences in electrode capacitance across the panel, maintaining stimulation frequency substantially constant.

Amplitude and frequency control loops may be engaged to control the power level and frequency presented to the panel. An amplitude control loop keeps the stimulation voltage level under control. A frequency control loop controls phase.

A mux with high-voltage switching transistors is used to drive multiple stimulation electrodes in sequence as part of a touch sensing scan. A high-voltage switch multiplexer is controlled to successively switch line drive to the capacitive-load lines.

Multiple switched line drivers can be used in parallel for touch screen designs that use multiple scan lines in parallel to stimulate the touch screen. Phase control can be used to keep multi-scan-line operations in phase.

Figure 3:
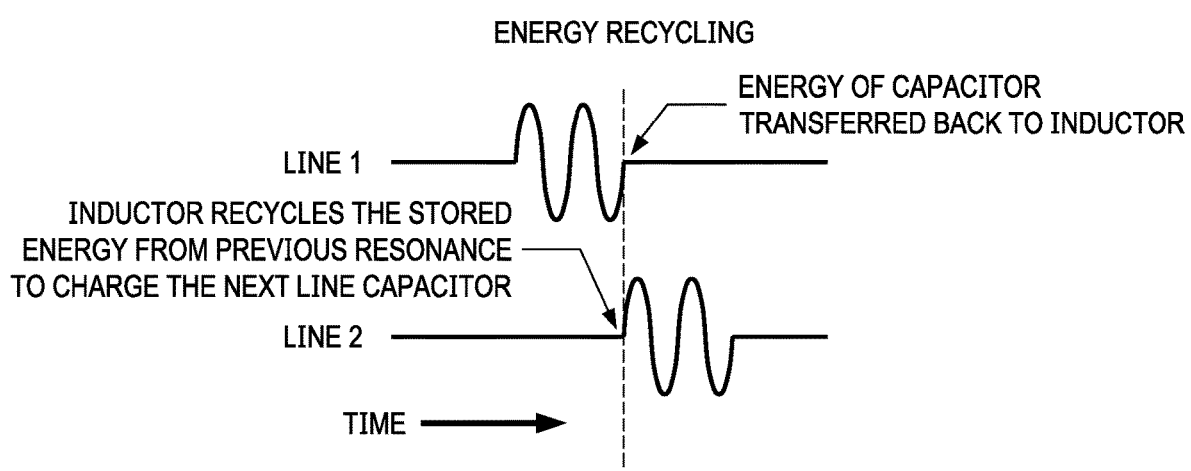
FIG. 3 functionally illustrates energy recycling using the resonant line driver with an energy transfer inductor, including zero-crossing line capacitance switching.

FIG. 3 functionally illustrates energy recycling using the resonant line driver with an energy transfer inductor, including zero-crossing line capacitance switching.

Line capacitance energy is transferred back to the energy transfer inductor. Inductor recycles the stored energy from previous resonance to charge the next line capacitance.

Energy recycling is provided by switching line drive at zero crossings. Zero crossing detection allows low-loss crossovers from one stimulation line to another. Zero-crossing detection is used to coordinate stimulation electrode switching with the stimulus waveform so that energy on one stimulation electrode can be collected and transferred to another one in the course of a panel scan.

Figure 4:
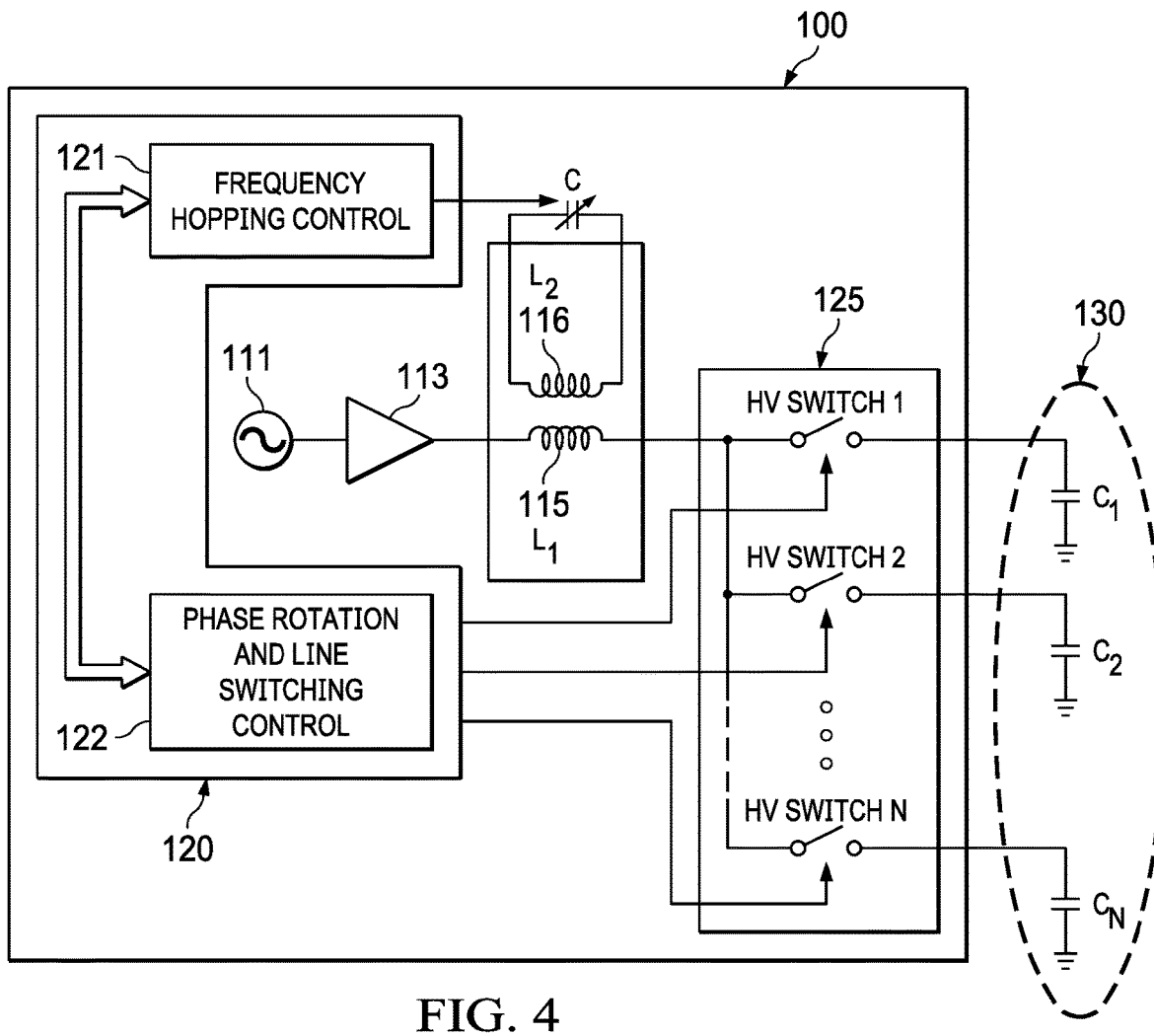
FIG. 4 illustrates an example functional embodiment of a switched resonant line driver IC (integrated circuit) with an energy transfer inductor, adapted for driving an example mutual capacitance touch screen (represented by line capacitors C1-CN) through a high-voltage switch array/mux.

FIG. 4 illustrates an example functional embodiment of a switched resonant line driver IC (integrated circuit) with an energy transfer inductor, adapted for driving an example mutual capacitance touch screen (represented by line capacitors C1-CN) through a high-voltage switch array/mux.

The resonant line driver recycles energy between inductor L1 and one line cap, C1-CN, at a time, using zero-voltage-switching.

L1-L2 can be either integrated or external.

HV switch can be implemented as cascoded PMOS that float along with signal. Because the impedance of C1-CN is high at resonance, the HV switches need to exhibit low loss only during energy transfer operation. The high-voltage switches can be implemented in standard CMOS technologies as a part of the main IC or a separate IC if needed.

EMI can be reduced by implementing frequency hopping (spread spectrum) along with phase rotation/cancellation.

Can be used even when display is dimmed or off.

The inductor L1 and line capacitance form a resonant network. Signal energy is transferred through the inductor, into the line capacitor. Due to the LC resonance, the energy oscillates between the inductor and line capacitor. After a few sinusoidal cycles, based on zero-crossing detection when the capacitor energy goes to zero, the inductor is switched to the next line capacitor. That is, the inductor retrieves energy from the previous line capacitor, and supplies that energy to the next line capacitor.

Hence, the energy gets recycled. Some amount of energy will be lost. Feedback can be used to determine when and how much energy needs to be provided to the inductor. However, due to resonance mechanism, the additional energy required will be small and infrequent.

To reduce EMI effects, frequency hopping (spread spectrum) and phase rotation/cancellation can be used. Frequency hopping can be implemented using a transformer with a variable cap (on-chip). The transformer can be external, or integrated.

Figure 5:
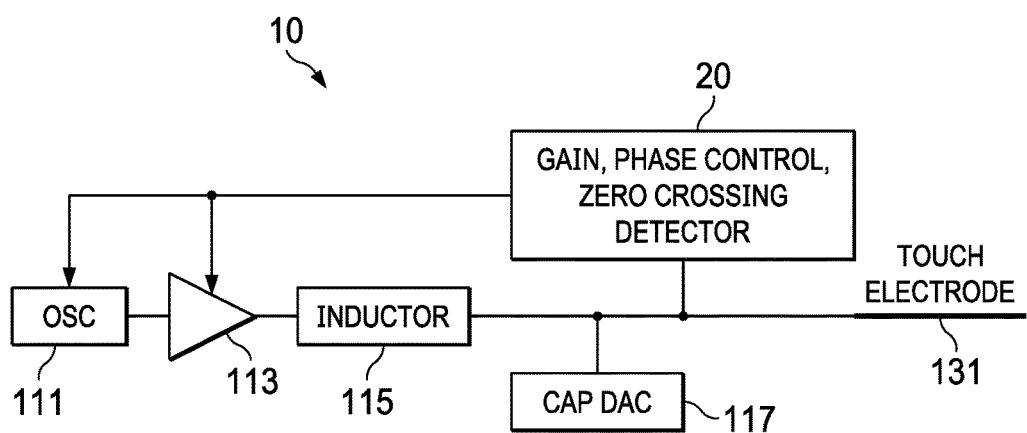
FIG. 5 illustrates example alternate functional embodiment of a resonant line driver including a dedicated energy transfer inductor for each capacitive-load line.

FIG. 5 illustrates example alternate functional embodiment of a resonant line driver including a dedicated energy transfer inductor for each capacitive-load line.

This alternate embodiment eliminates the high-voltage switching transistors. Design trade-offs include resonant frequency for the resonant network formed by the energy transfer inductor and the line capacitance (C1-CN). For example, a resonant frequency in an example range of 200-500 kHz would require relatively large ET inductor, while using class D switching in an example switching range of 2-200 MHz range would enable a significant reduction in ET inductor size.

Advantages of the resonant line driver including energy transfer inductor for driving capacitive-load lines include: (a) significantly lower power consumption (using power recycling); (b) relaxed requirements for heat dissipation; (c) smaller die area; (d) significantly reduced EMI (using frequency hopping, phase rotation and cancellation.

Additional advantages include: (a) high efficiency since the resonant amp both boosts the stimulation voltage and drives the panel; and (b) enables touch sense solutions that can operate at near theoretical efficiency limits; and (c) enables touch solutions that can run continuously without draining system battery.

The Disclosure provided by this Description and the Figures sets forth example embodiments and applications illustrating aspects and features of the invention, and does not limit the scope of the invention, which is defined by the claims. Known circuits, functions and operations are not described in detail to avoid obscuring the principles and features of the invention. These example embodiments and applications can be used by ordinarily skilled artisans as a basis for modifications, substitutions and alternatives to construct other embodiments, including adaptations for other applications.

The invention claimed is:

1. A driver circuit for sequentially driving multiple capacitive loads, the driver circuit for use in a touch system using capacitive sensing, comprising:

a resonant line driver to supply a drive signal at a controlled signal frequency; an energy transfer inductor LI coupled to receive the drive signal; multiple electrode terminals, each electrode terminal to be couple to a respective drive line of the touch system, the drive line having a load capacitance a load capacitance CL;

a switch array to switch the energy transfer inductor LI to the multiple electrode terminals, according to a controlled switching sequence, the energy transfer inductor L1 to form an L1CL resonator circuit when coupled to each electrode terminal.

2. The driver circuit of claim 1, further comprising an amplitude control loop including the resonant line driver, to control the signal energy delivered to the L1CL resonator circuit; and a frequency control loop including the resonant line driver, to control the signal frequency including phase control.

3. The driver circuit of claim 2, wherein the frequency control loop includes a transformer circuit with a variable capacitance and an inductance L2 magnetically coupled to the energy transfer inductor LI; a frequency controller to control signal frequency by controlling the variable capacitance.

4. The driver circuit of claim 2, wherein the frequency controller controls, for the L1C1 resonator circuits in sequence, signal frequency based on spread spectrum signal transmission.

5. The driver circuit of claim 2, wherein the switch array is controllable, for each L1CL resonator circuit in sequence, to switch the energy transfer inductor energy transfer inductor L1 between a current electrode terminal and a next electrode terminal when signal energy in the energy transfer inductor L1 is at a maximum relative to the signal energy of the load capacitance CL associated with the current electrode terminal is at a minimum.

6. The driver circuit of claim 1, wherein the touch system includes a mutual capacitance touch screen; and wherein the electrode terminals are connectable to respective drive lines of the mutual capacitance touch screen.

7. The driver circuit of claim 5, wherein the switch array controllable to switch the energy transfer inductor LI between the current electrode terminal and the next electrode terminal at a zero_crossing associated with signal energy in an L1CL resonator circuit associated with the current electrode terminal having cycled to the energy transfer inductor LI.

8. A system for capacitive touch sensing, comprising:
a resonant line driver to supply a drive signal at a controlled signal frequency;
a touch sense unit using capacitive sensing, having multiple drive lines each with a load capacitance CL;
the resonant line driver including:
an energy transfer inductor LI coupled to receive the drive signal;
a switch array controllable to switch the energy transfer inductor L1 to couple to a respective drive line according to a controlled switching sequence, the energy transfer inductor L1 to form an L1CL resonator circuit when coupled to each load capacitance CL.

9. The system of claim 8, wherein the switch array is controllable, for each L1CL resonator circuit in sequence, to switch the energy transfer inductor L1 between a current load input and a next load input when signal energy in the energy transfer inductor L1 is at a maximum relative to the signal energy of the load capacitance CL of the current load input.

10. The system of claim 9, wherein the switch array controllable to switch the energy transfer inductor LI between the current load input and the next load input at a zero_crossing associated with signal energy in an L1CL resonator circuit associated with the current load input having cycled to the energy transfer inductor LI.

11. The system of claim 8, further comprising an amplitude control loop including the resonant line driver, to control the signal energy delivered to the L1CL resonator circuit; and a frequency control loop including the resonant line driver, to control the signal frequency including phase control.

12. The system of claim 11, wherein the frequency control loop includes a transformer circuit with a variable capacitance and an inductance L2 magnetically coupled to the energy transfer inductor LI; a frequency controller to control signal frequency by controlling the variable capacitance.

13. The system of claim 11, wherein the frequency controller controls, for the L1C1 resonator circuits in sequence, signal frequency based on spread spectrum signal transmission.

14. The system of claim 8, wherein the touch system includes a mutual capacitance touch screen.

15. A method for sequentially driving a touch system using capacitive sensing having multiple drive lines each with a load capacitance CL, corresponding to multiple capacitive loads, comprising:
supplying, through an energy transfer inductor L1, a drive signal at a controlled signal frequency;
successively switching the energy transfer inductor L1 to the drive lines of the touch system according to a controlled switching sequence, the energy transfer inductor L1 to form an L1CL resonator circuit when coupled to each load capacitance CL.

16. The method of claim 15, further comprising using an amplitude control loop to control the signal energy delivered to the L1CL resonator circuit; and using a frequency control loop to control the signal frequency including phase control.

17. The method of claim 16, wherein the frequency control loop controls, for the L1C1 resonator circuits in sequence, signal frequency based on spread spectrum signal transmission.

18. The method of claim 15, wherein, for each L1CL resonator circuit in sequence, the energy transfer inductor LI is switched between a current L1CL resonator circuit and a next L1CL resonator circuit at a zero_crossing associated with signal energy in the current L1CL resonator circuit having cycled to the energy transfer inductor LI.

19. The method of claim 15, wherein the touch system includes a mutual capacitance touch screen, and the method is used to control drive lines of a mutual capacitance touch screen, and the load capacitance CL of a load corresponds to the load capacitance of the drive line.

* * * * *